Nov. 14, 1961 W. J. DALY 3,008,514
WELDING TORCH VIEWING SHIELD ATTACHMENT
Filed March 28, 1960
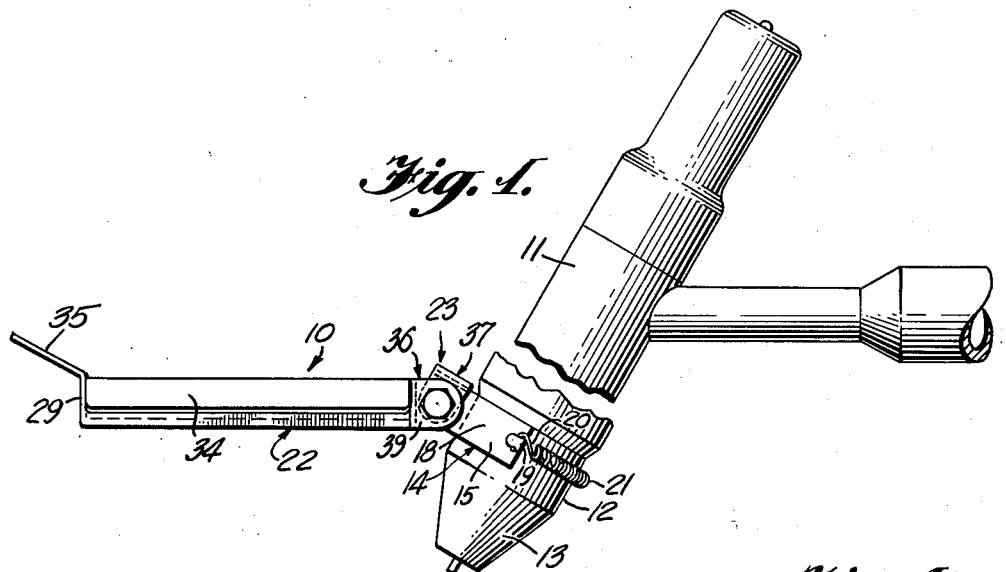
Fig. 1.
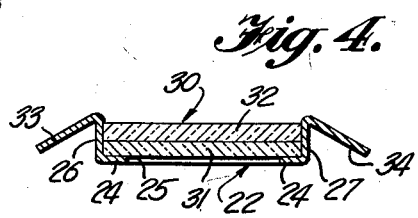
Fig. 4.
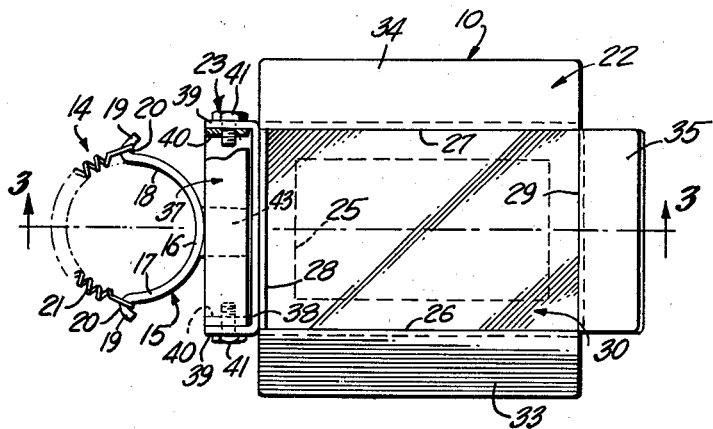
Fig. 2.
Fig. 3.
INVENTOR
Webster J. Daly
BY Mason, Fenwick & Lawrence
ATTORNEYS 3,008,514
Patented Nov. 14, 1961

3,008,514
WELDING TORCH VIEWING SHIELD ATTACHMENT
Webster J. Daly, 701 Pershing Square Bldg., 5th and Hill Sts., Los Angeles, Calif.
Filed Mar. 28, 1960, Ser. No. 18,168
1 Claim. (Cl. 158—27.4)

The present invention relates in general to safety shields for welding torches, and more particularly to safety shield attachments adapted to be mounted on heliarc welding torches and the like to protect the eyes of the operator.

Heretofore, protection for the eyes of a welder has been afforded by heavy, bulky welding hoods adapted to be worn on the head of the operator which consist primarily of a large sheet metal shield portion curved to extend entirely over the face and the sides and top of the head of the operator, and include a rectangular opening along the line of sight between the eyes of the operator and the work which is covered by a suitable welding lens. These hoods are designed to shield the eyes of the operator from the bright glare of the arc. Such welding hoods are large, bulky objects of considerable weight which impose substantial physical strain on the wearer and restrict his freedom of movement, as well as requiring substantial storage space when not in use. The practical disadvantages arising from the bulk and weight of such welding hoods are well known among people engaged in the welding arts.

An object of the present invention is the provision of a small compact safety shield for protecting the eyes of welders from the welding arc, which is readily attachable to and supported by the welding torch to free the operator from the necessity of wearing a bulky welding hood.

Another object of the present invention is the provision of a novel welding safety shield and eye protector adapted to be removably supported on a welding torch, wherein the safety shield is readily adjustable to selected angular positions relative to the welding torch to interpose a plain or magnifying safety lens assembly in the line of sight between the operator's eyes and the welding arc zone to effectively protect and/or aid the eyes of the operator.

Another object of the present invention is the provision of a novel welding safety shield and eye protector which is compact and light in weight, and which may be readily attached to and angularly adjusted relative to a welding torch to dispose a protective lens assembly close to the wlelding arc and between the welding arc and the eyes of the operator to effectively shield a large zone from undesirable effects of the welding arc.

Other objects, advantages and capabilities of the present invention will become apparent from the following detailed description, taken in conjunction with the accompanying drawing illustrating one preferred embodiment of the invention.

In the drawings:

FIGURE 1 is a side elevation of a welding safety shield embodying the present invention, illustrated in assembled relation to a heliarc welding torch;

FIGURE 2 is a top plan view of the welding safety shield;

FIGURE 3 is a vertical longitudinal section view thereof taken along the line 3—3 of FIGURE 2; and FIGURE 4 is a vertical transverse section view thereof taken along the line 4—4 of FIGURE 2.

Referring to the drawing, wherein like reference characters designate corresponding parts throughout the several figures, one preferred embodiment of the welding safety shield assembly constructed in accordance with the present invention is indicated generally by the reference character 10 and is designed to be carried by the heliarc welding torch 11 at a point along the electrode holder barrel near the lower or working end of the torch, as for example on the cylinderical surface 12 of the conventional gas-directing nozzle 13 which is threadedly supported onto the electrode holder barrel at the working end of the torch 11. To this end, the safety shield assembly 10 is provided with a coupling unit 14 which in the preferred embodiment herein illustrated comprises a semi-circular arcuate mounting strap 15 of bendable sheet metal having a limited degree of resiliency, the mounting strap 15 having a medial or base portion 16 and a pair of legs 17, 18 bent into conformity with a corresponding portion of the nozzle surface 12. The free ends of the legs 17, 18 terminate in recurved ears 19 defining anchoring ears or tabs to which the hook-shaped terminal formations 20 at the opposite ends of a coil spring 21 are to be releasably secured with the spring 21 extending around the portion of the periphery of the nozzle 13 not embraced by the mounting strap 15.

A lens supporting frame 22 is supported in outwardly projecting relation from the coupling unit 14 alongside the welding torch by means of a hinge joint 23 to permit angular adjustment of the lens supporting frame relative to the axis of the welding torch. The lens supporting frame 22, in the preferred embodiment herein illustrated, is formed from a single blank of sheet metal and comprises a bottom wall or rectangular frame member 24 having a rectangular opening 25 therein, a pair of vertical side walls 26 and 27 and inner and outer end walls 28 and 29 all bent upwardly at right angles to the plane of the bottom wall 24 and spaced to define an upwardly opening recess for removably supporting a protective lens assembly 30. The lens assembly 30 may be a single lens or a plurality of lenses and may be plain or magnifying. For example, the lens assembly may include a lower clear, protective lens 31 and an upper lens 32 such as a No. 9 welding lens or such other welding lens as may be suitable for the particular work to be done, or a known corrective lens. The rectangular opening 25 in the bottom wall 24 is of slightly smaller dimensions than the protective lens assembly 30 so that the marginal frame portions of wall 24 lap slightly over the edges of the lenses. The lens assembly 30 in this example is held in place by intimate frictional abutment of the side and end walls 26, 29 with the marginal edges of the lens assembly.

Side flaps 33 and 34 extend laterally outwardly and downwardly at an angle of about 45° from the upper edges of the side wall 26, 27 and an outer end flap 35 thereof extends outwardly and upwardly at an angle of about 45° from the upper edge of the outer end wall 29. The side and end flaps 33, 34 and 35 are integral with the side and end walls and are formed by bending extensions of the side and end walls outwardly through the required angles. The side and end flaps substantially extend the zone above the safety shield which is protected from sparks or other objects flying outwardly from the welding arc zone to provide a substantial zone within which the operator's head may safely be moved.

The hinge joint 23 interconnecting the lens supporting frame 22 and coupling unit 14 may conveniently be formed of a pair of channel shaped straps 36, 37. The web 38 of the hinge strap 36 is substantially coextensive with the inner end wall 28 of the lens supporting frame 22 and is welded or otherwise securely fixed thereto with the flanges 39 of the strap 36 projecting in parallelism with each other from the frame 24 and flanking similar flanges 40 of the hinge strap 37. Suitable hinge pins, for example formed of self tapping screws 41 extending loosely through openings in the hinge strap flanges 39 and threaded into openings in the hinge strap flanges 40, interconnect the hinge straps 36, 37 for rotation about a transverse axis. The web 42 of the hinge strap 37 is welded to a mounting tab 43 bent outwardly from the medial portion of the arcuate mounting strap 15 to rigidly secure these members together. The lapping hinge strap flanges 39 and 40 are arranged to be in rather tight frictional contact with each other to hold the lens supporting frame 22 at any angular position to which it has been manually adjusted to resist accidental movement of the lens supporting frame from its adjusted position.

In one satisfactory form of the invention, the bends in the lens supporting frame 22 may be so disposed as to provide a recess 25 which is two inches long, one and three-quarters inches wide, and one-quarter inch deep, the side and end flaps 33, 34 and 35 may extend one-half inch from the margins of their adjoining side and end walls 26, 27 and 29. The arcuate mounting strap in this exemplary form may be curved to a one inch diameter to form a semi-circular member terminating in recurved ears 19 which are about one-eighth inch long. While these dimensions have been found to be satisfactory to give a sufficiently large zone of protection to the operator when associated with a heliarc welding torch in a manner illustrated in FIGURE 1 of the drawing, it will be apparent that substantial variation in these dimensions may be made to suit various applications.

It will be appreciated that by this construction, an extremely compact and convenient eye-protecting shield for welding torches is provided which completely eliminates the necessity of using heavy, bulky welding hoods, and which can be readily adjusted relative to the torch to shield the zone of the operator's head from any of a wide variety of positions of the welding torch relative to the work. The shield assembly is readily removable from the welding torch and is of such small size it can be readily carried in the welder's pocket. Due to the spring and arcuate mounting strap construction of the coupling unit 14, the lens supporting frame 22 may be readily rotated about the axis of the torch to different angular positions spaced circumferentially about the welding torch as well as being adjustable up or down about the transverse hinge axis of the hinge joint 23. Also the coupling unit 14 may be readily adjusted to accommodate it to different sizes of torches by bending the legs 17, 18 of the arcuate mounting strap 15 to contours conforming to the nozzles of the different torches.

While but one preferred embodiment of the present invention has been particularly shown and described, it is apparent that various modifications may be made therein within the spirit and scope of the invention, and it is desired, therefore, that only such limitations be placed on the invention as are imposed by the prior art and set forth in the appended claim.

What is claimed is:

A shielding attachment adapted to shield the operator from the glare and flying sparks originating at a welding arc for welding torches of the type having a generally cylindrical nozzle portion adjacent the working end of the torch comprising a generally rectangular, planiform opaque lens supporting frame formed from a sheet metal blank and including a planar bottom wall having a rectangular sight opening therein and a pair of opposite substantially parallel side walls and a pair of opposite parallel end walls rising substantially perpendicular to said bottom wall defining therewith an upwardly opening rectangular well to receive welding lens means, welding lens means of generally rectangular configuration supported in said well provided in said lens supporting frame in registry with said sight opening, a coupling unit for removably supporting said lens supporting frame from said welding torch cylindrical nozzle portion adjacent the working end thereof in outwardly extending relation alongside the welding torch comprising a hinge assembly including a first channel shaped strap of sheet material forming one hinge element having a web portion overlying and rigidly secured to one of said end walls of said frame and a pair of flanges at the opposite ends of the web portion projecting away from the frame, a second channel shaped strap of sheet metal forming another hinge element having a web portion and a pair of flanges at the opposite ends of the web portion extending in flanking relation to the flanges of said first channel shaped strap, and hinge pin means pivotally interconnecting the flanges of said channel shaped straps along a hinge axis disposed immediately adjacent and substantially tangential to the surface of said cylindrical nozzle portion when said coupling member is mounted thereon, a substantially semicircular arcuate mounting strap of sheet material fixed adjacent the medial portion thereof to the web portion of said second channel-shaped strap, said mounting strap being of resiliently deformable material and having a pair of leg portions extending oppositely from said medial portion along paths to substantially conform to and resiliently embrace a semi-cylindrical portion of said cylindrical nozzle portion of the welding torch, said leg portions at their free ends terminating in recurved anchoring ears, an elongated coil spring having end formations removably hooked over said anchoring ears with the coil spring bridging the ends of said leg portions to extend around the remainder of the welding torch nozzle portion and retain the coupling member thereon, rigid opaque shielding flaps extending laterally from the upper edges of the side walls of said lens supporting frame along downwardly inclined relatively divergent planes, an upwardly and outwardly inclined opaque shielding flap rigidly fixed to the upper edge of the end wall of said lens supporting frame remote from the hinge assembly, and means for frictionally restraining the lens supporting frame at angular positions about the axis of the hinge assembly to which the frame is manually adjusted.

References Cited in the file of this patent

UNITED STATES PATENTS

| | | |
|---|---|---|
| 1,759,941 | Frey | May 27, 1930 |
| 1,836,878 | Sauer | Dec. 15, 1931 |
| 2,165,142 | Jeffreys | July 4, 1939 |
| 2,235,594 | Smith | Mar. 18, 1941 |

FOREIGN PATENTS

| | | |
|---|---|---|
| 129,177 | Great Britain | Mar. 19, 1919 |